United States Patent [19] [11] 4,227,210
Nixon [45] Oct. 7, 1980

[54] RADIATION SHUTTERS

[75] Inventor: Ralph D. Nixon, Braintree, England

[73] Assignee: English Electric Valve Company Limited, Chelmsford, England

[21] Appl. No.: 876,266

[22] Filed: Feb. 9, 1978

[30] Foreign Application Priority Data

Mar. 31, 1977 [GB] United Kingdom ............... 13605/77

[51] Int. Cl.² .................... H04N 5/33; H04N 3/14; H01L 17/00; G01J 1/00
[52] U.S. Cl. ................................. 358/113; 358/213; 250/334; 250/338
[58] Field of Search ............... 358/113, 213; 250/330, 250/332, 333, 334, 338

[56] References Cited
U.S. PATENT DOCUMENTS

| 2,339,256 | 1/1944 | Doncaster | 358/42 |
| 2,403,066 | 7/1946 | Evans | 359/113 |
| 3,003,064 | 10/1961 | Astheimer | 358/113 |
| 3,256,438 | 6/1966 | Astheimer | 358/113 |
| 3,638,025 | 1/1972 | Dishington et al. | 358/113 |
| 4,040,744 | 8/1977 | Schertz et al. | 250/330 |

Primary Examiner—Robert L. Griffin
Assistant Examiner—Edward L. Coles
Attorney, Agent, or Firm—Diller, Ramik & Wight

[57] ABSTRACT

A rotatable thermal shutter for use with a pyroelectric camera tube is provided with blades having opening and closing edges in the shape of a spiral. The use of a spiral shape allows the rotatable shutter to have a particularly small diameter while still providing satisfactory performance.

11 Claims, 3 Drawing Figures

RADIATION SHUTTERS

This invention relates to radiation shutters and is primarily intended for use with pyroelectric vidicon television camera tubes.

A pyroelectric vidicon camera tube is capable of generating a television video signal representative of changing temperatures in a thermal image and in order to obtain a non-zero signal representative of constant temperatures in a viewed thermal scene, it is customary to provide a rotating shutter having alternate opaque and clear portions to generate a superimposed periodic temperature modulation.

In order to extract the maximum signal from the camera tube, the raster scan lines should track closely in front of the opening and closing edges of the shutter.

Figure 1:
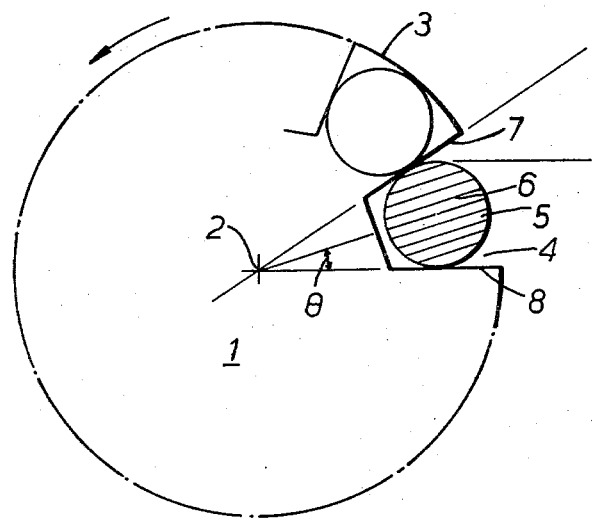

It is usual to employ a rotating shutter with alternate opaque and clear portions having radial opening and closing edges. Such a shutter is shown in FIG. 1 of the accompanying drawings, in which a shutter 1 is arranged to rotate about a fixed axis 2 so that as it rotates, blades 3 and slots 4 alternately pass in front of the target end of a pyroelectric vidicon television camera tube 5, which receives a thermal image of a viewed scene during those periods when the scene is exposed by the slots 4.

The camera tube 5 is orientated so that the central scan lines of the television raster pass through the axis 2, and these raster scan lines are diagrammatically represented at 6. It will be seen that the opening edge 7 and the closing edge 8 of slot 4 align with the direction of the raster scan lines only at the centre of the field of view of the camera tube 5, and that at the top and bottom an angular offset of $\theta$ exists. The angle $\theta$ decreases as the diameter of the shutter 1 increases, and in practice, is typically made about 15°. For smaller angles the size of the shutter is unacceptably large for many applications, but even so the angular offset is detrimental to the performance of the pyroelectric television system. In particular, it can cause image shading, and uneven depth of video signal modulation, and the present invention seeks to provide a radiation shutter in which this difficulty is reduced.

According to this invention, a rotatable radiation shutter capable of periodically interrupting thermal radiation as it rotates about a fixed axis includes a plurality of blade portions arranged symmetrically about the axis of rotation and having opening and closing edges in the shape of a spiral.

The aperture formed by the spaces between the blade portions may be open-ended to comprise slots, or may be bounded to comprise separate windows.

The blade portions are, preferably, composed of a thin sheet of material of uniform thickness and which is opaque to thermal radiation.

The blade portions may be flat and lie in a single plane, or alternately the blade portions may take the form of a conical surface, as described in our copending Patent Application referenced 13606/77.

According to a further aspect of this invention, a pyroelectric television camera tube is provided in combination with a radiation shutter as hereinbefore specified.

Preferably, the opening and closing edges of each blade portion are spaced sufficiently far apart so as to ensure that for certain periods the thermally sensitive portion of the camera tube is capable of being wholly shielded from incident radiation as the shutter rotates.

Preferably again, the closing and opening edges of adjacent blade portions are spaced sufficiently far apart so as to ensure that for certain periods the thermally sensitive portion of the camera tube is capable of being wholly exposed to incident radiation as the shutter rotates.

By correctly orientating the direction of the raster scan lines in relation to the spirally shaped opening and closing edges of the blade portions, it has been found that the shutter can be of smaller diameter than would be required for a shutter of the kind shown in FIG. 1 having radially cut opening and closing edges. Conversely, for the same diameter the effective offset angle $\theta$ is much smaller. However, with spirally cut edges, fewer blades can be accommodated around the circumference of the shutter, and so the shutter must be rotated more quickly to keep it in step with the television frame rate, but this does not present any serious difficulty.

Figure 3:
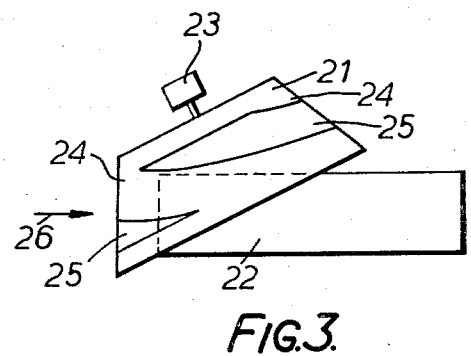
Figure 2:
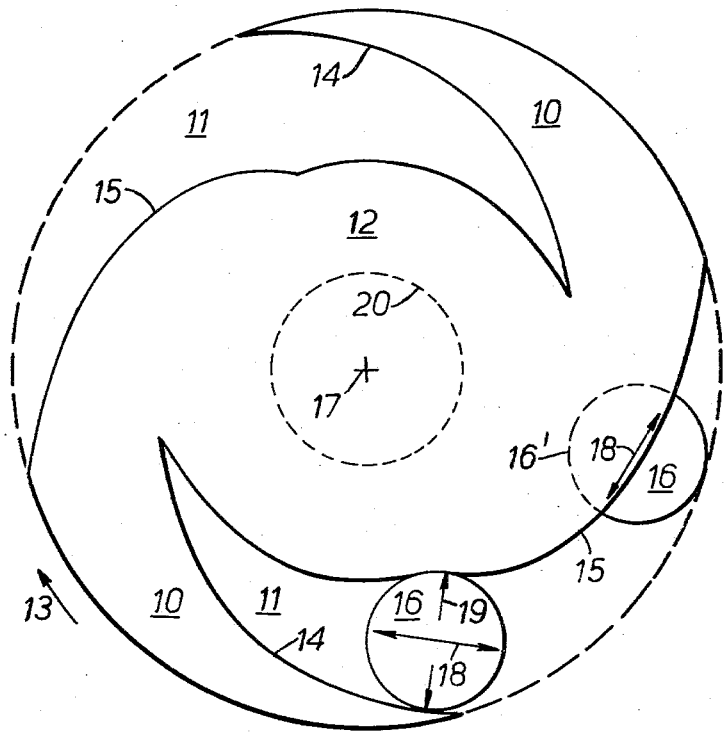

The invention is further described, by way of example, with reference to the accompanying drawings in which FIG. 2 illustrates a shutter in accordance with the present invention, and FIG. 3 shows a modified form of shutter used in conjunction with a pyroelectric television camera tube.

As will be seen from FIG. 2, the radiation shutter consists of two teeth, or blades 10 and two slots 11, the blades extending from a central region 12. The blades 10 and slots 11 have spiral edges 14, 15 which are generated from the central circle 20, shown in broken lines. Assuming that the radiation shutter rotates in the direction of the arrow 13 about an axis 17, the opening edges are indicated at 14, and the closing edges at 15, and as the shutter rotates these edges are swept across the thermally sensitive region of a vidicon camera tube 16.

The raster pattern of the television camera tube is orientated in the direction of arrows 18 so that so far as possible, the opening and closing edges align with the direction of the scan lines. The maximum error occurs at about halfway up the picture area of the camera tube and, in the example shown, would be about 2½% the picture height. This occurs with the shutter in the position relative to the camera tube which is indicated by line 16'. The size of the error is, of course, dependent on the overall diameter of the rotatable shutter, but for shutters of comparable diameter the error is must less than for the radially cut sectors shown in FIG. 1.

Although the shutter shown in FIG. 1 can accommodate a number of blades and slots around its circumference, a shutter of comparable diameter can accommodate relatively fewer spiral blades, for example, in FIG. 2 only two blades are provided. This is a very slight drawback, since it is merely necessary to increase the speed of rotation of the shutter accordingly and, in practice, this is easily accomplished.

The width of the slot 11 at the point 19 should be a little greater than the diameter of the target of the television camera tube 16 to avoid masking the top or bottom of the picture area, and similarly, the corresponding dimension of the blades should be greater than the target diameter to ensure that it is fully masked. The dimensions of the shutter and the spirals in relation to the camera tube diameter can be readily determined once the number of blades has been decided on. From this, the orientation of the scan line direction (as indicated by arrows 18) can be found relative to the axis 17 so as to minimize the errors earlier referred to.

It has already been explained that for a given shutter diameter these errors are less for a shutter having spiral edges in accordance with this invention, than are the errors which accompany the use of the shutter shown in FIG. 1. However, this property may instead be used to significantly reduce the diameter of the shutter. This is highly desirable, since the presence of a large shutter renders it difficult to incorporate a pyroelectric television camera tube in compact equipment. The effective size of the shutter can also be further reduced by forming the shutter on the surface of a conical section, as described in our copending Application No. 13606/77. This alternative is briefly indicated in FIG. 3, in which a shutter 21 is formed from a hollow frustro-conical surface, and is arranged to be rotated in front of a pyroelectric camera tube 22 by means of a small electric motor 23. As before, the rotation of the shutter is synchronised to the line period of the television raster. The spirally shaped blades 24 are formed on the conical surface by removing the appropriately shaped aperture portions 25. It will be appreciated that in this embodiment of the invention, the opening and closing edges are so shaped that the projection of the appropriate edge portion in the direction 26 onto the camera tube is the same as would be produced by a flat shutter having spiral opening and closing edges. This distinction is made since the true shape of the opening and closing edges, when viewed in a direction normal to the surface of the truncated cone, may appear to depart from that of a true geometric spiral.

In the cases of both the flat shutter and the conical shutter, a small motor is used to rotate the shutter in synchronism with the frame rate of the television camera tube, so that the blade edges immediately follow the line scans of the television raster.

I claim:

1. A pyroelectric television camera arrangement including a camera tube and a rotatable radiation shutter mounted so as to be capable of modulating thermal radiation incident upon the camera tube, the shutter having a plurality of blade portions arranged symmetrically about its axis of rotation and having opening and closing edges in the shape of a spiral, the camera tube being orientated in relation to the blade portions so that the line scan direction of the television raster is substantially aligned with said opening and closing edges as the thermal radiation is modulated by rotation of the shutter.

2. A pyroelectric camera arrangement as defined in claim 1 including means for rotating said shutter in synchronism with said television raster.

3. A camera as claimed in claim 1 and wherein the apertures formed by the spaces between the blade portions are open-ended to comprise slots.

4. A camera as claimed in claim 1 and wherein the apertures formed by the spaces between the blade portions are bounded to comprise separate windows.

5. A camera as claimed in claim 1 and wherein the blade portions are composed of a thin sheet of material of uniform thickness and which is opaque to thermal radiation.

6. A camera as claimed in claim 1 and wherein the blade portions are flat and lie in a single plane.

7. A camera as claimed in claim 1 and wherein the blade portions take the form of a conical surface.

8. A pyroelectric television camera including a radiation camera as claimed in claim 1.

9. A camera as claimed in claim 8 and wherein the opening and closing edges of each blade portion are spaced sufficiently far apart so as to ensure that for certain periods the thermally sensitive portion of the camera tube is capable of being wholly shielded from incident rotation as the shutter rotates.

10. A camera as claimed in claim 8 and wherein the closing and opening edges of the adjacent blade portions are spaced sufficiently far apart so as to ensure that for certain periods the thermally sensitive portion of the camera tube is capable of being wholly exposed to incident radiation as the shutter rotates.

11. In a pyroelectric television camera system, the combination of:
- a camera tube having an image-receiving target and means for periodically scanning said target, line by line, to obtain a useful video signal therefrom;
- a shutter mounted for rotation relative to said target, said shutter including window means defining spiral opening and closing edges for sweeping in front of said target respectively to unmask and mask said target progressively in a direction substantially perpendicular to the scanning direction; and
- means for rotating said shutter in synchronism with said scanning whereby the scan lines of said scanning track closely in front of said opening and closing edges.

* * * * *